(No Model)
J. F. WEBB.
METHOD OF AND APPARATUS FOR SEPARATING PRECIOUS METALS FROM THEIR SOLVENT SOLUTIONS.
No. 585,492. Patented June 29, 1897.
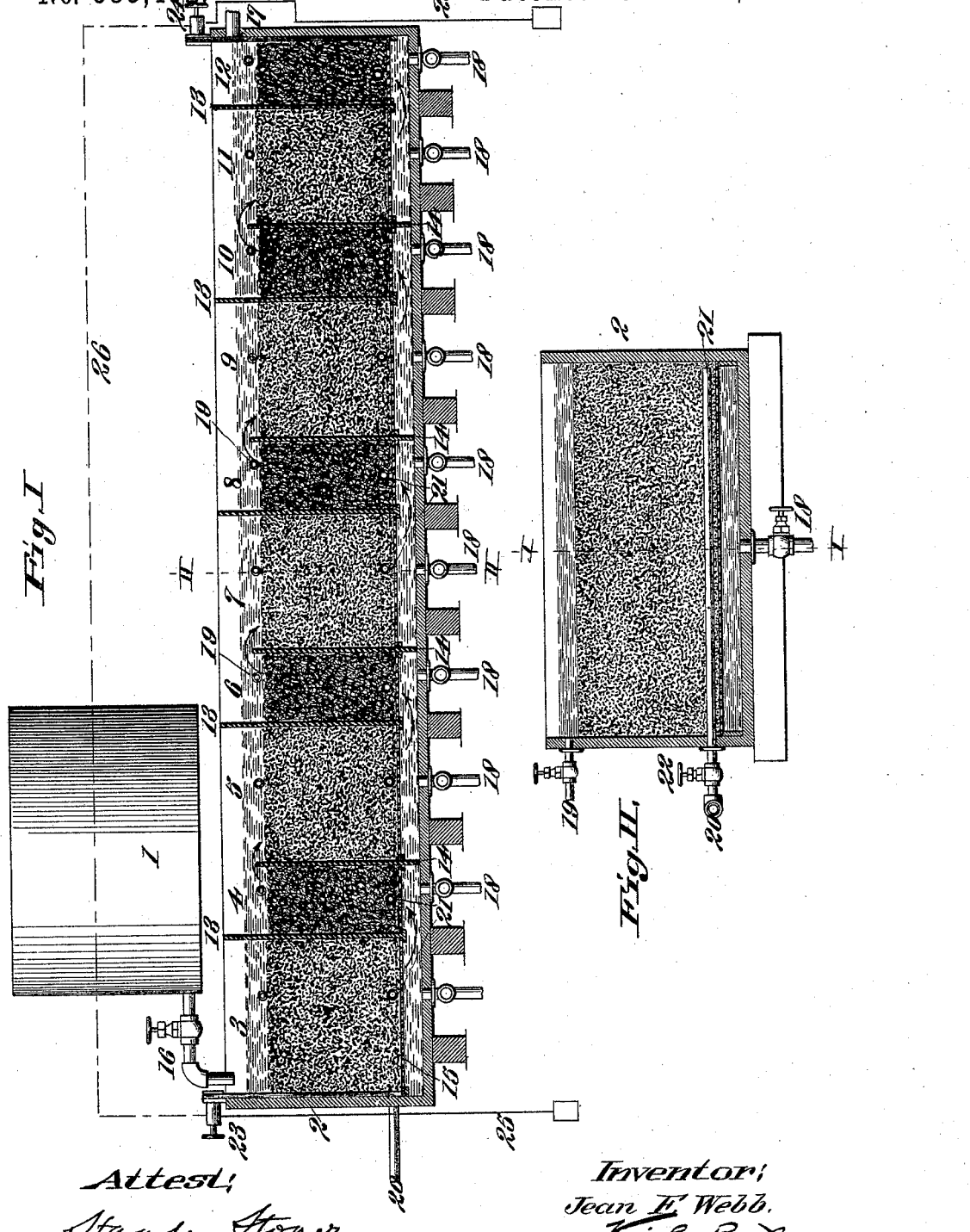

UNITED STATES PATENT OFFICE.

JEAN F. WEBB, OF ST. LOUIS, MISSOURI.

METHOD OF AND APPARATUS FOR SEPARATING PRECIOUS METALS FROM THEIR SOLVENT SOLUTIONS.

SPECIFICATION forming part of Letters Patent No. 585,492, dated June 29, 1897.

Application filed September 21, 1896. Serial No. 606,514. (No model.)

*To all whom it may concern:*

Be it known that I, JEAN F. WEBB, a citizen of the United States, residing at the city of St. Louis, in the State of Missouri, have invented a certain new and useful Improvement in Methods of and Apparatus for Separating Precious Metals from their Solvent Solutions, of which the following is a full, clear, and exact description, reference being had to the accompanying drawings, forming part of this specification.

This invention has for its principal objects the precipitation, separation, and recovery of precious metals from solutions containing them—such, for instance, as a solution of cyanid of potassium—and the filtration of the solution itself. These results are obtained by arranging or building a filter with a series of cells or compartments of any size desired, filled alternately with carbon and zinc, and through these compartments the solution is caused to pass in a downwardly direction through the carbon and in an upwardly direction through the zinc. The carbon may be in the form of either coke or charcoal, and the zinc should be in a finely-divided state. These compartments when thus filled or charged become positive and negative cells, and when flooded and connected with such a conductor as a solution of cyanid of potassium containing precious metals they at once begin to generate an active electrical current and hasten the precipitation of the precious metals held in the solution. The recovery and conversion into bullion of values deposited in or precipitated upon carbon being much easier and less expensive than the recovery from zinc it is designed and intended in this filter that the greater portion of the precious metals held in the solution shall be deposited in the carbon. To attain this object, the solution is made to flow downwardly through the carbon in order that as much as possible of the precious metals contained therein shall be mechanically deposited by filtration in or upon the upper layers of the carbon, and this object is further assisted by introducing a small perforated pipe into each zinc-compartment, through which at intervals a strong current of compressed air is turned. This volume of air, rising and bursting upward through the zinc, clears it of the brown powder-like deposit of precious metal precipitated upon it, forcing the deposit upward and carrying it over with the upward flow of the solution upon and into the carbon, where it is caught and held, and thus by filtration and forcing of the precipitates of the zinc upon it the upper layers of the carbon receive and soon become heavily filled with the precious metals. This richer upper portion of the carbon can be taken off from time to time for burning and smelting, and only at long intervals will a general "clean up" be necessary. The air-pipe in the carbon-compartments is used to keep the filter free from clogging by forcing the deposits and fine particles of carbon to the top, and it is also used when "cleaning up" to drive the solution out of the carbon. The decomposed zinc, with smaller portion of the precipitated values, is deposited in the bottom of the zinc-compartments, from whence it is taken out and treated in the usual method where zinc alone is used.

Figure I is a longitudinal section of my improved separator, taken on line I I, Fig. II. Fig. II is a transverse section taken on line II II, Fig. I.

Referring to the drawings, 1 represents a tank or vat containing gold and silver in a solution of cyanid of potassium. 2 represents a trough or vat divided into a number of compartments 3, 4, 5, 6, 7, 8, 9, 10, 11, and 12 by means of partitions 13 and 14. The partitions 13 extend from the top of the trough down to a perforated false bottom 15, located slightly above the bottom of the trough, and the partitions 14 extend from the bottom of the trough up through the false bottom and nearly to the top of the trough. The compartments 3, 5, 7, 9, and 11 are preferably made somewhat larger than the intermediate compartments, as shown in Fig. I. The larger compartments are filled with carbon, such as charcoal, and the smaller compartments are filled with zinc in a finely-divided form.

The tank 1 is provided with a discharge-pipe 16, that deposits the cyanid solution into the end compartment 3, and the solution passes in a downwardly direction through the carbon and then in an upwardly direction through the zinc in compartment 4, thence downward through the carbon-compartment 5, thence upward through the zinc in compartment 6, and so on through the series of cells until it reaches the end of the trough, where it escapes through a discharge-pipe 17.

18 represents valved pipes through which the compartments may be drained, and 19 represents valved pipes through which a portion of the solution may be withdrawn from the compartments, if desired. 20 represents an air-pipe provided with a branch 21 for each compartment, each branch 21 having a valve 22. The branches 21 are perforated within the compartments, the perforations being preferably made in the under side of the branches, as shown in Fig. I. These branches are located near the bottom of the compartments, just above the false bottom 15.

As the solution passes through the different compartments of the trough the carbon in the compartments 3 5 7, &c., filters the solution and takes up the larger portion of the precious metals as the solution flows in a downwardly direction. As the solution passes in an upwardly direction through the zinc contained in the compartments 4 6 8, &c., a small portion of the precious metals is precipitated, and by passing upward and downward through a number of these compartments containing alternately carbon and zinc the quick and effective recovery of the precious metals from the solution results, and the effectiveness of this action is facilitated by the electric current that is present.

23 represents a binding-post at one end of the trough, and 24 a binding-post at the other end of the trough. These binding-posts may be connected to the ground by wires 25 to complete the circuit, or they may be connected together by a wire 26.

When using a solution of cyanid of potassium, this method of filtering and precipitating the values has several advantages over the usual method where zinc alone is used. By passing it through the carbon filter all foreign matter in the solution, received either from the ore or from previous alkaline treatment thereof, is removed or neutralized before it reaches the zinc, and this, with the rapidity of the precipitation due to the electrolytic action, results in a large saving of zinc. There is also a saving in the amount of cyanid of potassium consumed.

The solution itself is completely freed from the values held in suspension, which are so fine that the utmost care and skill cannot save all of them at present, but by the electrolysis and filtration accomplished by the use of this filter every trace of them is removed and the solution is left in a far more efficient condition for use on a new charge of ore.

The solution is made to flow upwardly through the zinc in order that it may carry the precipitated values over into the carbon-compartments whenever the compressed-air current is turned on, but as the precipitate is formed on the under side of the zinc it will fall to the bottom if not forced upward by the air-current, and there will be but a small proportion of the values, together with fragments of partially-decomposed zinc found in the bottom of the zinc-compartments, from whence they can be taken and treated in the usual method where zinc alone is used.

I am aware that zinc has long been used as a precipitant; also, that carbon has been used as a filter, but I believe that I have discovered that a combination of both as parts of the apparatus shown results in an entirely new action impossible with either when used alone.

I do not limit myself to the use of a conductor connecting the carbon and zinc for the purpose of producing the electrolytic action in addition to the other action of the carbon and zinc, because I have found in practice that while the combined electrolytic and other action produce a superior result the action obtained by passing the solution down through the carbon and then up through the zinc is entirely sufficient in most, if not in all, cases. The passage of the solution first through the carbon prepares it for a better and more complete action in its passage through the zinc, and I have found in practice this particular mode of treatment recovers substantially all of the value from the solution.

I claim as my invention—

1. The improved method of separating precious metals from a solvent solution containing the same, consisting in passing the solution first in a downwardly direction through a body of carbon, then in an upwardly direction through a body of zinc, and then downwardly again through a body of carbon, substantially as set forth.

2. The improved method of separating precious metals from a solvent solution containing the same, consisting in passing the solution in a downwardly direction through a body of carbon, then in an upwardly direction through a body of zinc, substantially as set forth.

3. The improved method of separating precious metals from a solvent solution containing the same, consisting in passing the solution alternately through a body of carbon and zinc, and subjecting the same in its passage to an air-current, substantially as set forth.

4. The improved method of separating precious metals from a solvent solution containing the same, consisting in passing the solution downwardly through a body of carbon and thence upwardly through a body of zinc, and subjecting the same to the action of an electric current while passing through said bodies, substantially as set forth.

5. A metallurgical filter for separating precious metals from a solvent solution containing the same, consisting of a series of compartments filled alternately with carbon and zinc, and air-pipes located in the compartments containing the zinc, substantially as set forth.

6. A metallurgical filter for separating precious metals from a solvent solution containing the same, consisting of a series of alternate compartments, or receptacles, containing respectively carbon and zinc, through which the solvent solution is passed with an upward and downward flow, and electric-circuit-completing connections between the zinc and carbon, substantially as shown.

7. A metallurgical filter for precipitating and separating precious metals from a solvent solution containing the same, consisting of a series of alternate compartments, or receptacles, containing respectively carbon and zinc with an air-pipe introduced into each compartment, substantially as shown.

8. A metallurgical filter for precipitating and separating precious metals from a solvent solution containing the same, such filter being constructed of compartments, or receptacles, filled alternately with carbon and zinc, and so arranged that a continuous flow of the solvent solution takes place downward through the carbon and upward through the zinc, and will form a fluid connection between the carbon and zinc compartments, and thus generate electrical action, and electric-circuit-completing connections between the zinc and carbon, substantially as shown.

JEAN F. WEBB.

In presence of—
GEO. H. KNIGHT,
N. FINLEY.